United States Patent
Ochiai

(10) Patent No.: US 9,692,280 B2
(45) Date of Patent: Jun. 27, 2017

(54) LAMINATED CORE, VR TYPE RESOLVER AND PRODUCTION METHOD FOR LAMINATED CORE

(71) Applicant: MINEBEA CO., LTD., Kitasaku-gun, Nagano (JP)

(72) Inventor: Takaaki Ochiai, Yachimata (JP)

(73) Assignee: Minebea Co., Ltd., Kitasaku-gun (JP)

( * ) Notice: Subject to any disclaimer, the term of this patent is extended or adjusted under 35 U.S.C. 154(b) by 206 days.

(21) Appl. No.: 14/301,818

(22) Filed: Jun. 11, 2014

(65) Prior Publication Data
US 2015/0002141 A1 Jan. 1, 2015

(30) Foreign Application Priority Data
Jun. 27, 2013 (JP) ................................. 2013-135421

(51) Int. Cl.
*H02K 15/02* (2006.01)
*H02K 1/24* (2006.01)
*G01D 5/20* (2006.01)

(52) U.S. Cl.
CPC .......... *H02K 15/022* (2013.01); *G01D 5/2046* (2013.01); *H02K 1/246* (2013.01); *Y10T 29/4902* (2015.01)

(58) Field of Classification Search
CPC ................ G01R 31/2829; G01R 33/02; G01N 27/4077; G01N 35/08; G01L 3/101; G01L 3/104
USPC ...... 324/200, 207.11–207.25, 174, 500, 501, 324/96, 376, 211, 253, 127, 137
See application file for complete search history.

(56) References Cited

U.S. PATENT DOCUMENTS

2008/0258585 A1   10/2008  Kataoka et al.
2010/0156401 A1*  6/2010  Nishiguchi .......... G01D 5/2046
                                                    324/207.25
2014/0285052 A1*  9/2014  Tomohara ............... H02K 3/12
                                                    310/179

FOREIGN PATENT DOCUMENTS

| JP | A-2003-116252 | 4/2003 |
| JP | 2006-158005 A | 6/2006 |
| JP | 2008-268065 A | 11/2008 |
| JP | 2010-048775 A | 3/2010 |
| JP | A-2013-072673 | 4/2013 |
| JP | 2014-204495 A | 10/2014 |

OTHER PUBLICATIONS

Aug. 4, 2016 Office Action issued in Japanese Patent Application No. 2013-135421.

* cited by examiner

*Primary Examiner* — Melissa Koval
*Assistant Examiner* — Trung Nguyen
(74) *Attorney, Agent, or Firm* — Oliff PLC

(57) ABSTRACT

A production method for a rotor core for a VR type resolver has a structure in which one protrusion is formed on an inner edge thereof in which the rotor cores can be rotated and laminated without increasing cost. In a production method of a rotor core for a VR type resolver, a plurality of tabular rotor core pieces are laminated. In this case, in the rotor core pieces, four protrusions are simultaneously formed, one of them is left, the remainder thereof is removed, and rotating lamination is carried out.

3 Claims, 6 Drawing Sheets

LAMINATED CORE, VR TYPE RESOLVER AND PRODUCTION METHOD FOR LAMINATED CORE

BACKGROUND OF THE INVENTION

Field of the Invention

The present invention relates to a laminated core, a VR type resolver and a production method for the laminated core.

Description of Related Art

Japanese Unexamined Patent Application Laid-open No. 2013-72673 discloses a rotor of a VR type resolver having a structure in which a protrusion for fitting into a groove formed on a shaft is formed at one portion on the inside. A rotor core of the VR type resolver has a structure in which a plurality of core forming members in a thin plate shape are laminated in an axial direction, in order to reduce iron loss. In the laminated structure, in order to secure the uniformity of magnetic characteristic in a circumferential direction, each of the thin members is laminated while gradually being rotated in a so-called "rotating lamination". In addition, Japanese Unexamined Patent Application Laid-open No. 2003-116252 discloses a press automatic rotating lamination of iron cores for a motor having a structure in which a key groove (concavity), but not a protrusion, is formed at one portion on the inside.

In the technology described in Japanese Unexamined Patent Application Laid-open No. 2003-116252, a plurality of iron cores (thin members for forming the core) are laminated while relatively rotating, so as to position the key grooves, after the key grooves are simultaneously formed at different angular positions thereon and a punching process is carried out. In this structure, it is necessary to form the key grooves at different angular positions, and therefore, there is a problem in that the cost of used dies is increased or there is a problem in that shapes or positions of the key grooves are shifted in the rotating lamination.

In view of such circumstances, it is an object of the present invention to provide a production method for a laminated core having a structure in which a protrusion is formed on the inside or the outside which does not increase cost and in which the protrusions are prevented from shifting in rotating lamination.

SUMMARY OF THE INVENTION

A first aspect of the present invention has a laminated core having a protrusion on an inner edge or an outer edge, wherein the protrusion and concavities are formed on the same edge at fixed intervals. The laminated core includes a resolver, a rotor or a stator of a motor, or the like.

A second aspect of the present invention has the laminated core according to the first aspect, in which a plurality of tabular members are rotated at fixed angular intervals and are laminated, the number of protrusions is one and the protrusion and the concavities are arranged at even intervals. Here, the fixed angular intervals mean angular intervals in which tabular members for constituting the laminated core are laminated while rotating in the rotating lamination. For example, in the case in which a four-layer structure is obtained by the rotating lamination, the tabular members are laminated while rotating every 90 degrees.

A third aspect of the present invention has the laminated core according to the second aspect, in which the laminated core is a rotor core of a VR type resolver, the rotor core includes a magnetic pole portion having a double axial angle NX, in which N is a natural number of 2 or more, and an opening at the center, the protrusion and the concavities are formed on the inner edge facing to the opening, the number of protrusions is one, and the number of concavities is N−1.

A fourth aspect of the present invention has a VR type resolver contains a stator, and a rotor core according to the first aspect, in which the rotor core is rotatably held to the stator.

A fifth aspect of the present invention has a production method of a laminated core contains a step for forming an opening in which protrusions are formed at even intervals, the number of the formed protrusions is N and N is a natural number of 2 or more, a step for removing the protrusions in which the number of the removed protrusions is N−1 and one of the protrusions is left, a step for punching out an outer edge thereof, and a step for laminating iron cores of the laminated cores produced by the above steps while matching positions of the protrusions.

According to the fifth aspect, since the rotating lamination is carried out after removing the protrusions that are not finally required, the protrusions can be simultaneously formed using one die, and the protrusions can be prevented from shifting in rotating lamination.

A sixth aspect of the present invention has the production method of a laminated core according to the fifth aspect, in which the number of the formed protrusions (N) is 4, and the step for removing the protrusions is carried out by two apparatuses having two punches for removing the protrusions.

According to the present invention, in a production of the laminated core having a structure in which a protrusion is formed on the inside or the outside, rotor cores having a protrusion can be rotated and laminated without increasing cost.

PREFERRED EMBODIMENTS OF THE INVENTION

Processing Apparatus

FIG. 1 shows a processing apparatus 100 for a rotor core (an example of laminated cores) of a VR type (a variable reluctance type) resolver. The processing apparatus 100 is used for processing electrical steels, so as to produce rotor core pieces that constitute the rotor core. The rotor core is produced by laminating the rotor core pieces that were processed by the processing apparatus 100. In this laminating, a rotating lamination is carried out. Here, the electrical steel is used as a material that constitutes the rotor core; however, other magnetic materials can also be used. The rotor core explained in this embodiment has a double axial angle 4X. The rotor core of the VR type resolver having a double axial angle 4X has a nearly circular shape having four magnetic pole portions that protrude radially from an axial center, so as to obtain power for four cycles while the rotor core rotates one cycle. The magnetic pole portions are formed at even intervals, and in the case of a double axial angle 4X, they are formed at angular intervals of 90 degrees.

Figure 1A:
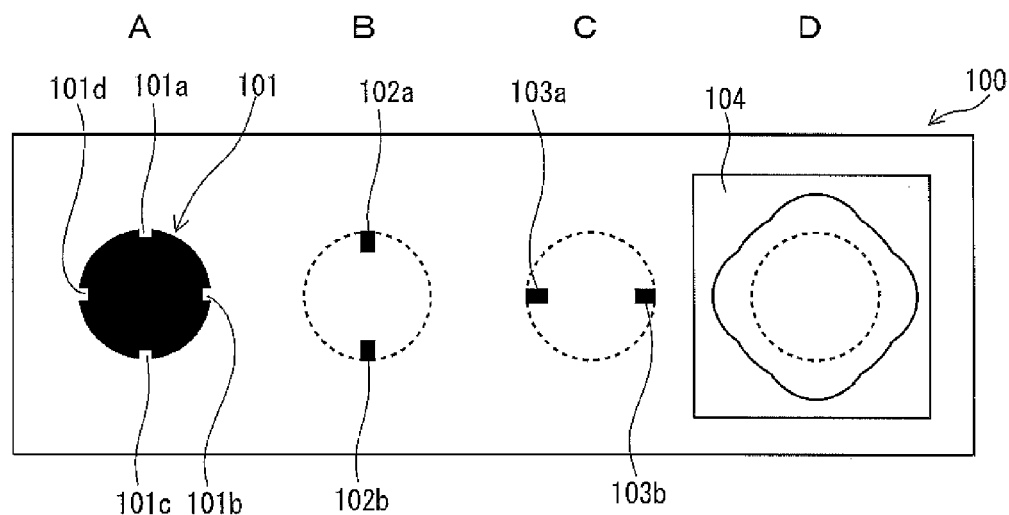
FIG. 1A is a front view showing a processing apparatus for a rotor core in an embodiment of the present invention.
Figure 1B:
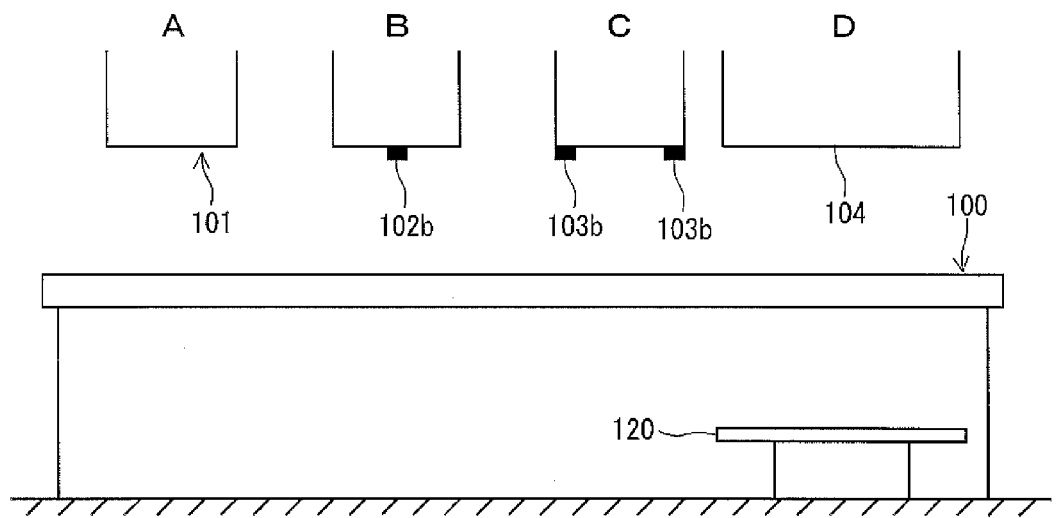
FIG. 1B is a side view thereof.

The processing apparatus 100 includes an apparatus A for punching out the magnetic steel using an inner die 101, an apparatus B for punching it out using punches 102a and 102b, an apparatus C for punching it out using punches 103a and 103b, and an apparatus D for punching it out using on outer die 104, viewed from a left side of FIG. 1. These apparatuses are arranged at even intervals. Specifically, the inner die 101 of the apparatus A is a die for forming an opening at the center of the rotor core. The inner die 101 has a nearly round shape, and concavities 101a, 101b, 101c and 101d are formed on the outer edge thereof. The concavities 101a to 101d are formed at angular positions every 90 degrees (that is, at clock positions 0:00, 3:00, 6:00, and 9:00). The inner die 101 is moved forward and backward in a depth direction of FIG. 1A (in a perpendicular direction of FIG. 1B). An electrical steel 200 described below (see FIGS. 2A to 2E) is punched out by the inner die 101, and for example, an opening in a nearly round shape represented by reference numeral 201 in FIGS. 2A to 2E is formed.

The punch 102a in the apparatus B is a punch for removing a protrusion 201a formed by a concavity 101a of the inner die 101, and the punch 102b in the apparatus B is a punch for removing a protrusion 201c formed by a concavity 101c of the inner die 101. With respect to the punches 102a and 102b, both of them may be simultaneously used, and only one of them may be used after the other is fed (retracted) toward the axial center.

The punch 103a in the apparatus C is a punch for removing a protrusion 201d formed by a concavity 101d of the inner die 101, and the punch 103b in the apparatus C is a punch for removing a protrusion 201b formed by a concavity 101b of the inner die 101. With respect to the punches 103a and 103b, both of them may be simultaneously used, and only one of them may be used after the other is fed (retracted) toward the axial center.

Figure 6:
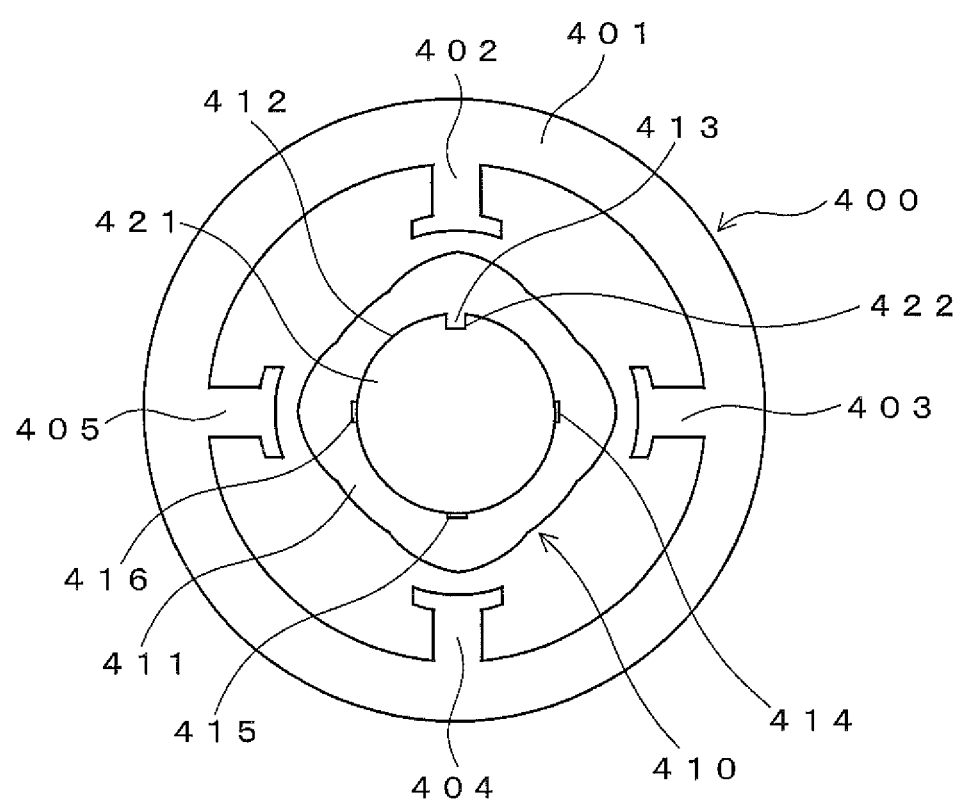
FIG. 6 is a cross sectional view in an axial direction showing a VR type resolver.

The outer die 104 in the apparatus D is a die for forming an outer shape of a thin member for forming the rotor core (a rotor core piece). A center opening is formed by the inner die 101, and an outer portion thereof is punched out by the outer die 104, whereby, rotor core pieces 211, 212, 213 and 214 shown in FIGS. 2 and 4 are obtained. A rotor core 410 in FIG. 6 is produced by laminating a plurality of the rotor core pieces while turning in an axial direction. Here, the axis is a rotation axial center of the rotor core, and the axial direction is a direction in which a rotation axis of the rotor core extends.

In a final step of the processing apparatus 100, a rotation stage 120 is provided. The rotation stage 120 is arranged and rotated under the apparatus D, so that the rotor core pieces punched out by the outer die 104 of the apparatus D are automatically placed thereon. That is, the rotor core pieces punched out by the outer die 104 automatically fall in a perpendicular direction, and are placed on the rotation stage 120. For example, when the rotor core pieces are already placed on the rotation stage 120, the rotor core pieces on the rotation stage 120 can be laminated by the falling of the next rotor core piece punched out by the outer die 104 on top of them. In addition, the rotor core pieces can be laminated while rotating by rotating the rotation stage 120.

Assembly

In the following, an example of steps for producing the rotor core will be explained. FIGS. 2A to 2E, 3A to 3D and 4A to 4B show in a stepwise manner the steps for producing the rotor core. An elongated electrical steel 200 is prepared. In this electrical steel 200, a cavity (not shown) is formed by embossing as a positioning means for the processing apparatus 100. In addition, a protrusion (not shown) for engaging the positioning means on the electrical steel 200 is formed on the processing apparatus 100, whereby the electrical steel 200 is positioned for the processing apparatus 100. Furthermore, an opposite surface of the above cavity formed on the electrical steel 200 is formed in a convex shape, and each of the rotor core pieces to be laminated on the rotation stage 120 is positioned using this uneven structure.

The long electrical steel 200 is processed while being sequentially fed from left to right of the processing apparatus 100 in FIG. 1. Here, although there are steps after FIG. 4B, the steps after FIG. 4B are not illustrated (of course it may be completed at the step of FIG. 4B).

Figure 2A:
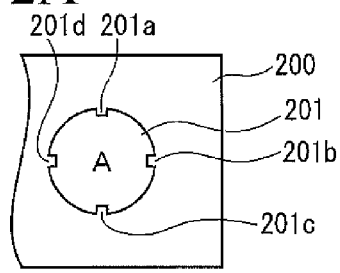
FIGS. 2A to 2E are schematic views showing in a stepwise manner the steps for producing the rotor core.

First, the processing shown in FIG. 2A is carried out. A right end of the electrical steel 200 is placed on the apparatus A arranged at a left end of the processing apparatus 100. The opening 201 is formed by punching out the electrical steel 200 using the inner die 101. On the inner edge of the opening 201, a protrusion 201a is formed by a concavity 101a of the inner die 101, a protrusion 201b is formed by a concavity 101b, a protrusion 201c is formed by a concavity 101c, and a protrusion 201d is formed by a concavity 101d. The protrusions 201a, 201b, 201c and 201d have a protruding structure that protrudes toward a direction of an axial center (center of the opening 201), and they are formed at angular intervals of 90 degrees, respectively.

Figure 2B:
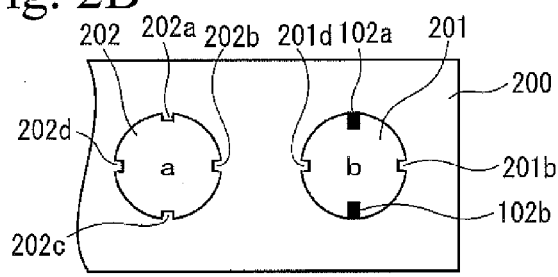
Figure 5:
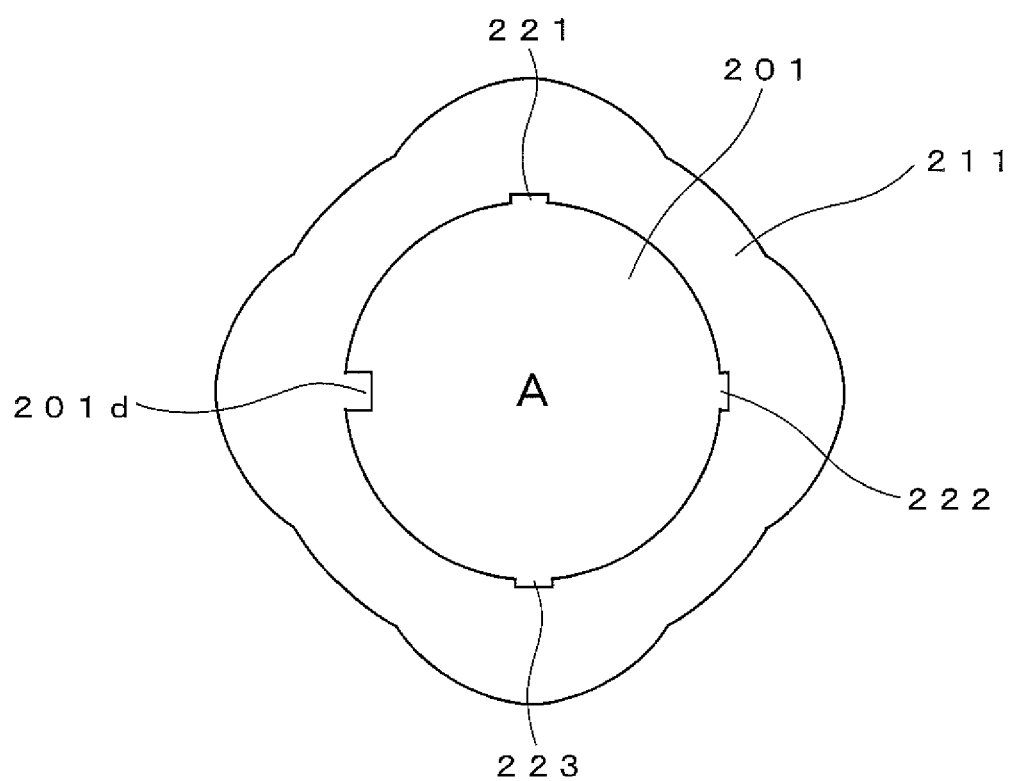
FIG. 5 is a front view showing a rotor core piece.

A processing shown in FIG. 2B is carried out after a state shown in FIG. 2A is obtained. In this process, the electrical steel 200 is further fed from the state shown in FIG. 2A to a right direction of the figure, and the center of the opening 201 matches the center of the apparatus B. The protrusions 201a and 201c are simultaneously removed using the punches 102a and 102b. In this case, it is preferable that removing positions agree with the inner edge of the opening 201 as exactly as possible; however, the protrusions 201a and 201c are sufficiently removed, so that burrs do not occur from the inner edge of the opening 201 toward the axial center. Therefore, the inner edge of the opening 201 is slightly cut at portions at which the protrusions 201a and 201c are removed, and small concavities are formed thereat as marks of removal. In FIG. 2, these concavities are not shown. FIG. 5 shows a state in which concavities 221 and 223 formed when the protrusions 201a and 201c are removed by the punches 102a and 102b are exaggerated. A concavity 222 is a mark of removal of the protrusion 201b removed by the following process. The concavity that is a mark of removal of this protrusion is formed in the same manner as that in another opening described below.

In the processing shown in FIG. 2B, the electrical steel 200 is punched out at the same timing at which the apparatus B performs processing, using the inner die 101 of the apparatus A, and whereby, an opening 202 is formed at a left side of the opening 201. The opening 202 has the same shape as that of the opening 201, and the protrusions 202a, 202b, 202c and 202d are formed on the inner edge.

Figure 2C:
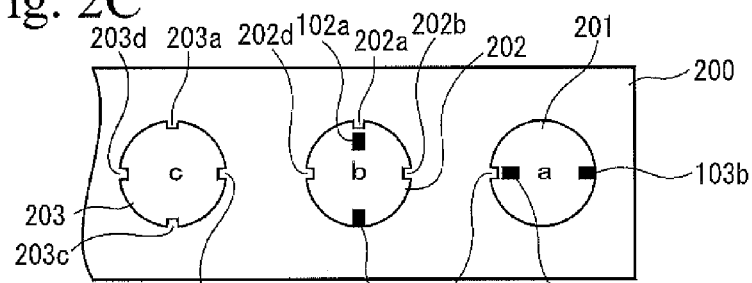

After the state shown in FIG. 2B is obtained, the electrical steel 200 is fed in a right direction of the figure in the processing apparatus 100, and a step shown in FIG. 2C is carried out. In this process, the center of the opening 201 is matched with the center of the apparatus C. At this time, since each apparatus in the processing apparatus 100 is arranged at even intervals, the center of the opening 202 is matched with the center of the apparatus B. The protrusion 201b of the opening 201 is removed by using the punch 103b in a state in which the punch 103a of the apparatus C is retracted. That is, the protrusion 201d is left without being removed. At the same timing as that in which this apparatus C performs processing, the protrusion 202c of the opening 202 is removed by using the punch 102b in a state in which the punch 102a of the apparatus B is retracted. That is, the protrusion 202a is left without being removed. At the same timing as that in which the apparatus C and the apparatus B perform processing, an opening 203 is formed at a left side of the opening 202 using the inner die 101 of the apparatus A. The opening 203 has the same shape as that of the openings 202 and 201, and protrusions 203a, 203b, 203c and 203d are formed on the inner edge.

Figure 2D:
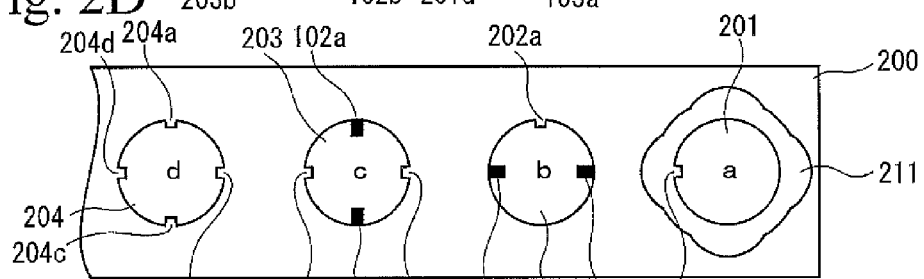

After the state shown in FIG. 2C is obtained, the electrical steel 200 is fed in a right direction of the figure in the processing apparatus 100, and a step shown in FIG. 2D is carried out. In this process, the center of the opening 201 is matched with the center of the apparatus D. At this time, since each apparatus in the processing apparatus 100 is arranged at even intervals, the center of the opening 202 is matched with the center of the apparatus C, and the center of the opening 203 is matched with the center of the apparatus B. The outside of the opening 201 is punched out using the outer die 104 of the apparatus D, and rotor core pieces 211 in a nearly circular shape including four magnetic pole portions which protrude from an axial center toward a radical direction, are obtained. The rotor core pieces 211 fall and are placed on the rotation stage 120 arranged under the apparatus D.

Figure 2E:
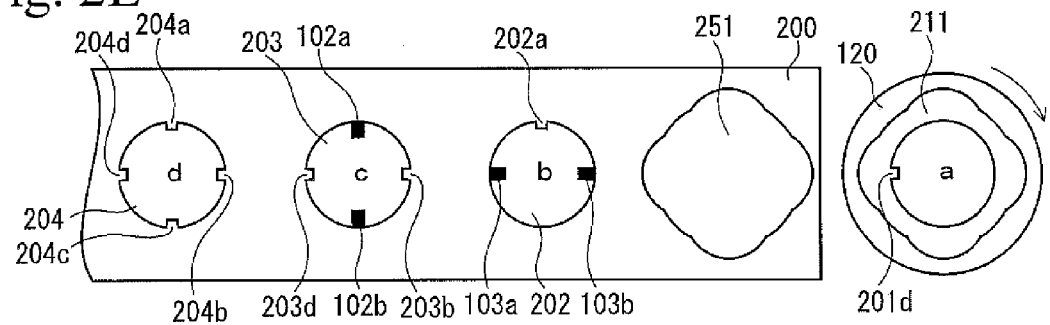

This state is shown in FIG. 2E. In FIG. 2E, a punching mark 251 formed by punching out using the apparatus D, is shown. In FIG. 2E, the rotation stage 120 is described at a right side of the processing apparatus 100 from the viewpoint of drawing (actually, the rotation stage 120 is placed under the processing apparatus 100, as shown in FIG. 1). This is the same in FIGS. 3 and 4.

At the same timing at which this apparatus D processes, the protrusions 202d and 202b are removed by using the punches 103a and 103b of the apparatus C. In addition, at the same timing at which the apparatus D and the apparatus C perform processing, the protrusions 203a and 203c on the edge of the opening 203 is removed by using the punches 102a and 102b of the apparatus B. Furthermore, at the same timing at which the apparatus D, the apparatus C and the apparatus B perform processing, an opening 204 is formed by using the inner die 101 of the apparatus A. The opening 204 has the same shape as those of the openings 201 to 203, and the protrusions 204a, 204b, 204c and 204d are formed on the inner edge thereof.

In the state shown in FIG. 2E, the rotation stage 120 is rotated clockwise by 90 degrees. Specifically, the protrusion 201d of the rotor core piece 211 punched out by the apparatus D is formed in a direction of 9:00 o'clock, and the rotor core piece 211 is placed on the rotation stage 120 in this state (a state shown in FIG. 2D). Then, the protrusion 201d is positioned in a direction for 0:00 o'clock by rotating clockwise by 90 degrees the rotation stage 120.

Figure 3A:
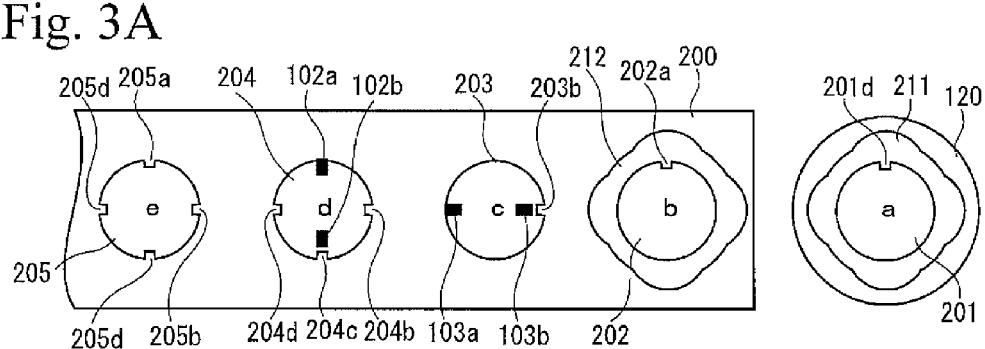
FIGS. 3A to 3D are schematic views showing in a stepwise manner the steps for producing the rotor core.

The electrical steel 200 is fed to a right direction in the figure, after the rotor core piece 211 is rotated clockwise by 90 degrees from the state shown in FIG. 2E, and a step shown in FIG. 3A is performed. In this process, the center of the opening 202 is matched with the center of the apparatus D. In this case, since each apparatus of the processing apparatus 100 is arranged at even intervals, the center of the opening 203 is matched with the center of the apparatus C, and the center of the opening 204 is matched with the center of the apparatus B. In this state, the rotor core piece 211 in which the protrusion 201d is arranged at a position for 0:00 o'clock, is placed on the rotation stage 120.

Figure 3B:
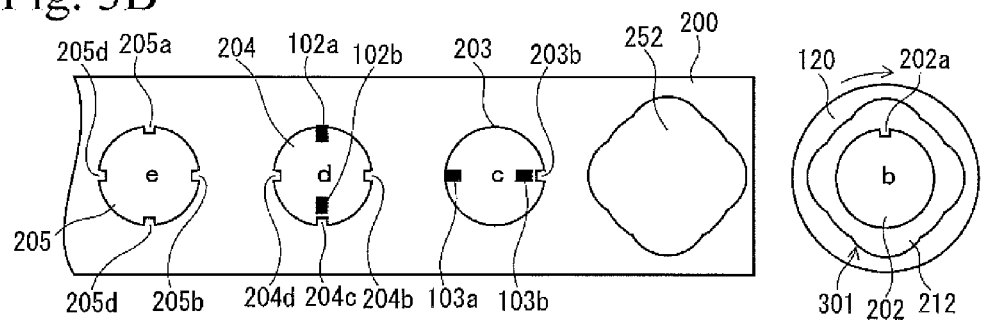

Then, the rotor core piece 212 is obtained by punching out an outer portion of the opening 202 using the outer die 104 of the apparatus D. The rotor core piece 212 has the same shape as that of the rotor core piece 211 (a shape which agrees therewith when rotating), and falls and is placed on the rotation stage 120 arranged under the apparatus D. At this time, the stator core piece 12 is laminated on the stator core piece 211 by having a shape in which the protrusions are combined, since the rotor core piece 211 in which the protrusion 201d is fed in a direction for 0:00 o'clock is placed on the rotation stage as shown in FIG. 3A. This state is shown in FIG. 3B. In FIG. 3B, a punching mark 252 formed by punching out using the apparatus D is shown.

At the same timing at which this apparatus D processes, the protrusion 203d is removed by using the punch 103a of the apparatus C. In addition, at the same timing at which the apparatus D and the apparatus C perform processing, the protrusion 204a on the inner edge of the opening 204 is removed by using the punch 102a of the apparatus B. Furthermore, at the same timing at which the apparatus D, the apparatus C and the apparatus B perform processing, an opening 205 is formed by using the inner die 101 of the apparatus A. The opening 205 has the same shape as those of the openings 201 to 204, and protrusions 205a, 205b, 205c and 205d are formed on the inner edge thereof.

On the rotation stage 120, the rotor core piece 212 is laminated on the rotor core piece 211, so that a state shown in FIG. 3B is obtained, and then the rotation stage 120 is rotated clockwise by 90 degrees. The protrusions 201d and 202a are positioned in a direction for 3:00 o'clock by this rotation.

Figure 3C:
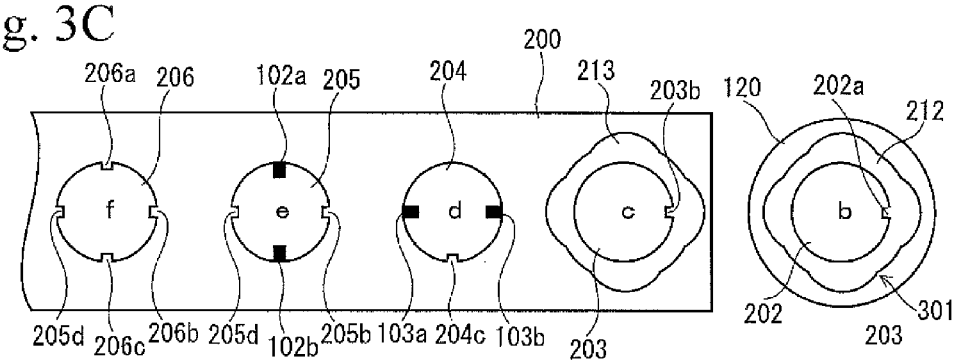
Figure 3D:
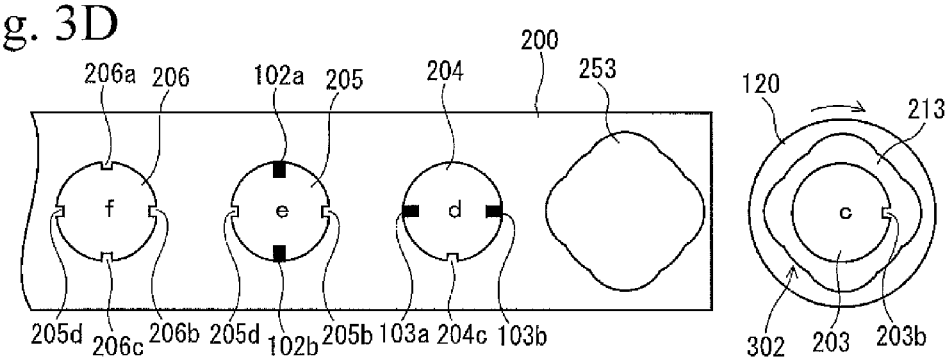

Next, a step shown in FIG. 3C is carried out. In this process, the center of the opening 203 is matched with the center of the apparatus D. At this time, since each apparatus of the processing apparatus 100 is arranged at even intervals, the center of the opening 204 is matched with the center of the apparatus C, and the center of the opening 205 is matched with the center of the apparatus B. Then, an outer portion of the opening 203 is punched out by using the outer die 104 of the apparatus D, and a rotor core piece 213 is obtained. The rotor core piece 213 has the same shape as those of the rotor core pieces 211 and 212 (a shape which agrees therewith when rotating), and it falls downward by being punched out using the outer die 104, and it is placed on the rotation stage 120 arranged under the apparatus D. At this time, the rotor core pieces 211 and 212 in which the protrusions are fed in a direction for 3:00 o'clock are placed on the rotation stage 120, and therefore, the rotor core pieces 211, 212 and 213 are laminated by having a shape in which the protrusions are combined. This state is shown in FIG. 3D. In FIG. 3D, a punching mark 253 formed by punching out using the apparatus D, is shown.

At the same timing in which this apparatus D performs processing, the protrusions 204d and 204b are removed by using the punches 103a and 103b of the apparatus C. In addition, at the same timing at which the apparatus D and the apparatus C perform processing, the protrusions 205a and 205c are removed by using the punches 102a and 102b of the apparatus B. Furthermore, at the same timing at which the apparatus D, the apparatus C and the apparatus B perform processing, an opening 206 is formed by using the inner die 101 of the apparatus A. The opening 206 has the same shape as those of the openings 201 to 205, and protrusions 206a, 206b, 206c and 206d are formed on an inner edge thereof.

Next, in the state shown in FIG. 3D, the rotation stage 120 is rotated clockwise by 90 degrees. The overlapped three protrusions 201d, 202a and 203b are positioned at 6:00 o'clock by this rotation (see FIG. 4A).

Figure 4A:
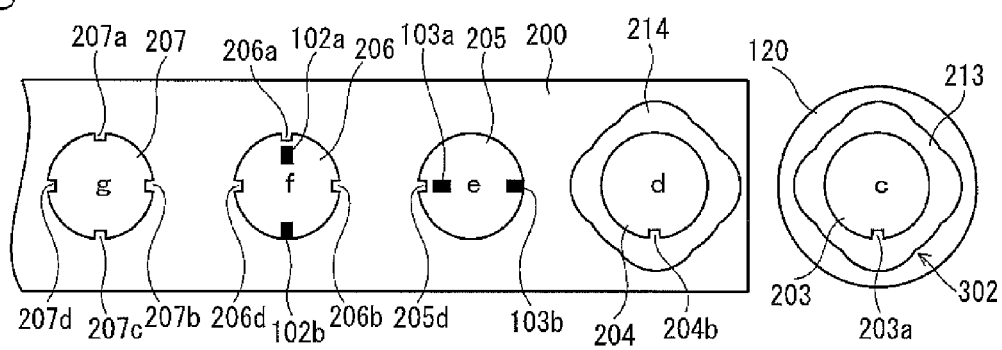
FIGS. 4A and 4B are schematic views showing in a stepwise manner the steps for producing the rotor core.
Figure 4B:
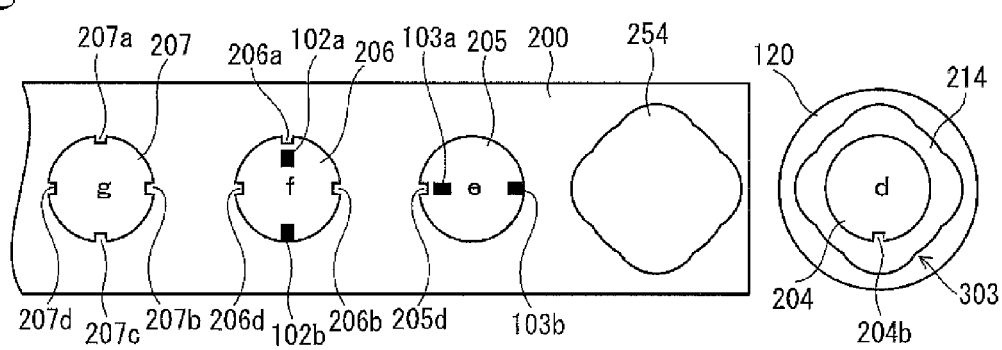
Figure 4C:
FIG. 4C is a side view showing a laminated core in which rotor core pieces are laminated.

Next, a step shown in FIG. 4A is carried out. In this process, the center of the opening 204 is matched with the center of the apparatus D. At this time, since each apparatus of the processing apparatus 100 is arranged at even intervals, the center of the opening 205 is matched with the center of the apparatus C, and the center of the opening 206 is matched with the center of the apparatus B. Then, an outer portion of the opening 204 is punched out by using the outer die 104 of the apparatus D, and a rotor core piece 214 is obtained. The rotor core piece 214 has the same shape as those of the rotor core pieces 211, 212 and 213 (a shape which agrees when rotating), and it falls downward by the action of the outer die 104 and is placed on the rotation stage 120 arranged under the apparatus D. At this time, the rotor core pieces 211, 212, 213 and 214 are laminated in a shape in which the protrusions are combined, since on the rotation stage 120 the rotor core pieces 211, 212 and 213 in which the protrusions are fed in a direction of 6:00 o'clock are placed. This state is shown in FIG. 4B. In FIG. 4B, a punching mark 254 formed by punching out using the apparatus D is shown.

At the same timing at which the apparatus D performs processing, the protrusion 205b is removed by using the punch 103b of the apparatus C. In addition, at the same timing at which the apparatus D and the apparatus C perform processing, the protrusion 206c is removed by using the punch 102b of the apparatus B. Furthermore, at the same timing at which the apparatus D, the apparatus C and the apparatus B perform processing, an opening 207 is formed by using the inner die 101 of the apparatus A. The opening 207 has the same shape as those of the openings 201 to 206, and protrusions 207a, 207b, 207c and 207d are formed on an inner edge thereof.

The four rotor core pieces 211, 212, 213, and 214 are rotated by 90 degrees and are laminated by the above process, whereby a laminated body 303 is obtained. In this rotating lamination, each the rotor core piece is fixed by caulking using dowel protrusions formed on the surface thereof (not shown) and concavities formed on the rear surface thereof (not shown), so as to obtain the laminated body. The number of the rotor core pieces to be laminated is not limited. However, for example, when the rotor core is obtained by rotating lamination of the four rotor core pieces 211, 212, 213 and 214, the laminated body 303 forms a rotor core.

The rotor core pieces are further laminated by repeating the above process. Here, actions of each punch are regular and repeatedly avoid and cut. In the following, these actions are specifically explained by using the punch 102a of the apparatus B. The process shown in FIG. 2B cuts the protrusion, the process shown in FIG. 2C avoids the protrusion, the process shown in FIG. 2D cuts the protrusion, the process shown in FIG. 3A cuts the protrusion, the process shown in FIG. 3C cuts the protrusion, and the process shown in FIG. 4A avoids the protrusion. That is, the protrusion is avoided one in four times. This ratio can be carried out in any punch.

It is preferable that the center of the magnetic pole portion formed on an outer edge of the rotor core (the most protruded portion) be matched with the center of the protrusion and that the concavity be formed on an inner edge thereof. For example, when the protrusion and the concavity are formed at a boundary between the magnetic pole portions, except for the center of the magnetic pole portion, magnetic characteristics in the rotor core are affected, and detection accuracy and detection level are decreased.

The number of the rotor core pieces to be laminated is not limited, and the number can be optionally selected. In the above process, first, one of the four protrusions simultaneously formed is left, and the remaining three protrusions are removed. The rotor core pieces are laminated while rotating at 90 degrees so that the left protrusions are placed at angular positions every 90 degrees. In this way, each protrusion of the rotor core pieces is positioned, and the rotating lamination is carried out without overlapping the same positions.

The apparatus B and the apparatus C for removing the protrusions explained by the above process have two punches, respectively. However, an apparatus having four punches in which the apparatus B and the apparatus C are combined may be arranged between the apparatus A and the apparatus D. In this case, according to the apparatus having four punches, one protrusion is sheltered from the punch and the remaining three protrusions are removed by the punch. The protrusions to be removed are rotated as the processing progresses. In addition, four apparatus having one punch, respectively, may be placed between the apparatus A and the apparatus B.

Laminated rotor cores in which protrusions are formed on an outer edge are very similar to laminated rotor cores in which protrusions are formed on an inner edge. In the following, a summary will be given. A plurality of concavities is formed on the outer die 104 of the apparatus D, as explained for the apparatus A. When the electrical steel is punched out in a state without a concavity, a plurality of protrusions is formed on the outer edge. In contrast, according to the present invention, an opening is formed on the inner edge by the apparatus A. In the punching process in the apparatus B and the apparatus C, punches are placed at portions in which protrusions are formed, and portions in which the protrusions are removed are punched out by round openings or square openings. Portions in which the protrusions are formed are not punched out. Then, the outer edge is punched out by the apparatus D. As a result, protrusions are not formed at portions at which the round openings or square openings were already formed, and protrusions are formed at portions at which processing was carried out. The punched out rotor cores are placed and rotated on the rotation stage.

FIG. 6 shows a cross sectional view in an axial direction of a VR type resolver using the rotor cores produced by the above process. In FIG. 6, the VR type resolver 400 is shown. The VR type resolver 400 has a stator yoke 401. The stator yoke has a nearly tubular structure in which a thin magnetic material, such as an electrical steel, is punched out in a shape as shown, and it is laminated in an axial direction.

The stator yoke 401 has salient poles 402 to 405 that protrude toward the axial center. For example, exciting coils (not shown) are wound around the salient poles 402 to 405, respectively, sine phase detection coils (not shown) are wound around the salient poles 402 and 404, respectively, and cosine phase detection coils (not shown) are wound around the salient poles 403 and 405, respectively.

A rotor 410 rotatably held to the stator yoke 401 is placed at the inside of the stator yoke 401. The rotor 410 has a structure in which a rotor core 411 and a shaft 421 are combined.

The rotor core 411 has a structure in which a plurality of rotor core pieces are laminated by methods shown in FIGS. 2 to 4. The rotor core 411 has an opening 412, and a protrusion 413 that protrudes in an axial direction and concavities 414, 415 and 416 are formed at a portion facing to the opening 412 (an inner edge). The protrusion 413 has a structure in which a cross sectional shape as shown extends in an axial direction. The concavities 414, 415 and 416 correspond to the concavities 221, 222 and 223 shown in FIG. 5, and have a structure in which a cross sectional shape as shown extends in an axial direction. The protrusion 413 and the concavities 414, 415 and 416 are arranged at even intervals (even angular positions) in a circumferential direction.

In the shaft 421, the concavity 422 having a shape that matches the protrusion 413 is formed. A rotation stopping structure of the rotor core 411 to the shaft 421 can be obtained by combining the rotor core 411 with the shaft 421 in a state in which the protrusion 413 is matched with the concavity 422.

Advantages

In one rotor core piece, four protrusions are simultaneously formed using one die. Therefore, the present invention can avoid a problem in that cost of the die is increased and a problem in that shapes and positions of protrusions are shifted in rotating lamination. The rotating lamination is carried out by laminating the rotor core pieces while rotating in order, whereby the uniformity of the magnetic characteristics in a circumferential direction can be ensured. That is, four protrusions are formed on one rotor core piece, and one protrusion thereof is left. Then, the rotating lamination is carried out by rotating and laminating the rotor core pieces so as to shift the left protrusions by every 90 degrees, whereby the positions of the protrusions can be matched.

The protrusions 201a, 201b and 201c are removed by the punches so that the concavities 221, 222 and 223 that are marks of removal shown in FIG. 5, are formed. In this way, an obstruction when combining with the shaft 421, will not remain. When the protrusions are left, another process for removing them is further required, and manufacturing cost is increased. In contrast, according to the present invention, the additional process can be omitted and the production cost can be decreased, by removing the protrusions 201a, 201b and 201c using the punch, so as to form concavities 221, 222 and 223.

Other Matters

In the above embodiments, double axial angles are 4X. However, the number of double axial angles is not limited to 4X. For example, in the case in which the shaft double angle is 5X, the protrusions are formed at angular intervals of every 72 degrees, and one thereof is left and the other is removed. Then, the rotor core pieces are laminated while rotating by every 72 degrees. In this case, positions of protrusions to be left are selected so as to match the position of the protrusions when laminating while rotating at 72 degrees.

In addition, in the above embodiment, the process in which four rotor core pieces are laminated was explained; however, the number of the laminated rotor core pieces is not limited to four layers. The number of the protrusions is not limited to one. The laminated core may be a stator. The laminated core is not limited to use for a resolver, and it may be used for a rotor of a motor or a stator.

The embodiments of the present invention are not limited to each of the above embodiments and include various modifications that may be anticipated by one skilled in the art. In addition, the effects of the present invention are also not limited to the description above. That is, various additions, changes, and partial deletions can be made in a range that does not exceed the general concept and object of the present invention as claimed in the Claims and equivalents thereof.

What is claimed is:

1. A laminated core comprising:
 a plurality of tabular members including an inner edge, wherein
 the tabular members are laminated, in an axis direction and
 a plurality of protrusions and a plurality of concavities are arranged inside the inner edges of the tabular members in a radial direction, and arranged with a predetermined interval in a circumferential direction, wherein
 the laminated core as a rotor core comprises a magnetic pole portion, wherein the magnetic pole portion includes a double axial angle NX, in which N is a natural number of 2 or more, and an inner edge,
 the number of protrusions is one, and
 the number of concavities is N−1.

2. The laminated core according to claim 1, further comprising:
 a first tabular member and a second tabular member that are laminated with each other, wherein
 the first tabular member has one protrusion among the plurality of protrusions and one concavity among the plurality of concavities,
 the second tabular member has another protrusion and another concavity, wherein
 the plurality of protrusions and the plurality of concavities are arranged with a fixed interval.

3. A resolver comprising:
 a stator, and
 a rotor core comprising the laminated core according to claim 1,
 wherein the rotor core is rotatably held to the stator.

* * * * *